United States Patent [19]

Spear et al.

[11] 4,411,159
[45] Oct. 25, 1983

[54] A FIBRE REINFORCED RESIN COMPOSITE LEAF SPRING FOR DETERMINING THE MAGNITUDE OF A LOAD

[75] Inventors: Peter Spear, Wolverhampton; Paul A. Anson, Walsall, both of England

[73] Assignee: Rubery Owen Group Services Limited, Wednesbury, England

[21] Appl. No.: 282,079

[22] Filed: Jul. 10, 1981

[30] Foreign Application Priority Data

Jul. 12, 1980 [GB] United Kingdom ............... 8022876

[51] Int. Cl.³ ............................................. G01L 1/22
[52] U.S. Cl. ................................. 73/768; 73/862.65;
73/862.68; 177/211; 248/560; 248/634;
248/635; 428/297; 267/47; 267/158; 338/2
[58] Field of Search ............... 73/768, 862.68, 862.65;
177/211; 248/560, 634; 428/297; 267/36 R, 47,
158; 338/2

[56] References Cited

U.S. PATENT DOCUMENTS

| 2,298,216 | 10/1942 | Lamberger et al. | 73/768 |
| 2,757,923 | 8/1956 | Leffsheik | 73/862.68 |
| 3,080,748 | 3/1963 | Burkley | 73/768 |
| 3,350,926 | 11/1967 | Webb | 338/2 |
| 3,389,459 | 6/1968 | Russell | 73/768 |
| 3,779,071 | 12/1973 | Thomas | 338/2 |
| 4,311,980 | 1/1982 | Prudenziati | 338/2 |

FOREIGN PATENT DOCUMENTS 2655013 6/1978 Fed. Rep. of Germany ......... 338/2

OTHER PUBLICATIONS

Chiku et al., *JSA Transactions*, 10 (1), pp. 35–39 (1971).

Primary Examiner—James C. Cannon
Attorney, Agent, or Firm—Scrivener, Clarke, Scrivener and Johnson

[57] ABSTRACT

A member of composite material incorporates at least one strain responsive member within a part at which a strain is induced by a load in use. A signal which is a function of a strain detetected by the strain responsive member is communicated to an indicator or monitoring device which registers the applied load causing the strain.

In one embodiment a leaf spring for a vehicle comprises upper and lower elements of one or more superimposed strips of pre-impregnated longitudinally extending carbon fibres and an inner element of one or more strips of pre-impregnated glass fibres. During laying up of the strips two strain gauges (13, 14), which may be on or integral with a carrier strip, and their leads (13a, 13b, 14a, 14b) are introduced into the active length of the spring which experiences a bending moment on the application of a load. The gauges are positioned at a pre-determined distance apart which is maintained when the member is cured, as by hot press moulding.

11 Claims, 11 Drawing Figures

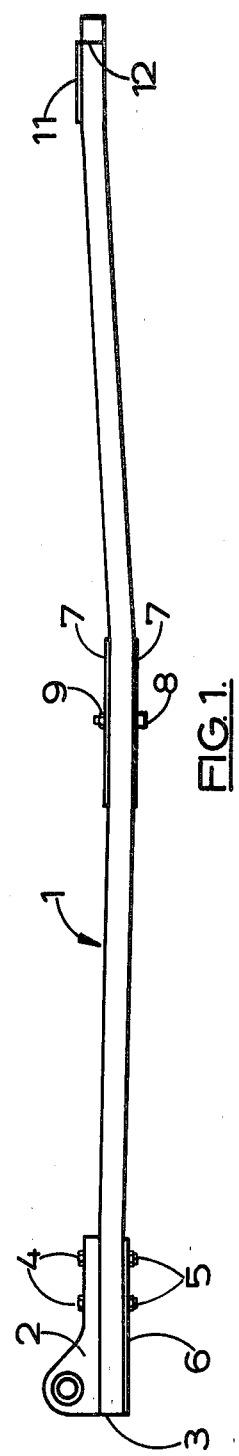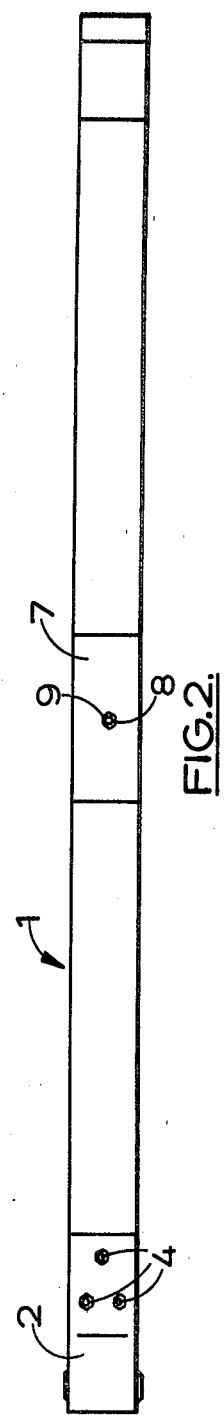
FIG.1.
FIG.2.

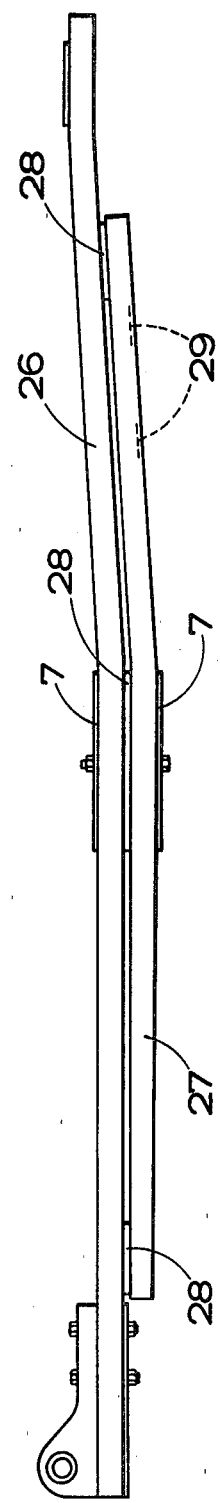
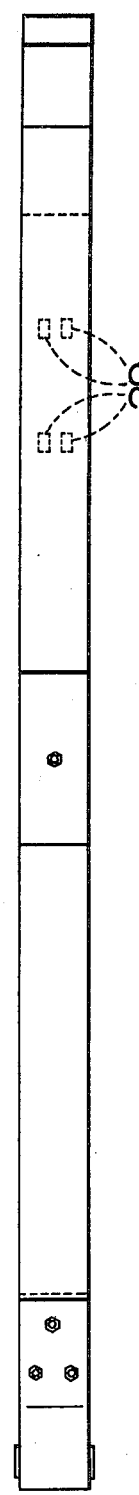

A FIBRE REINFORCED RESIN COMPOSITE LEAF SPRING FOR DETERMINING THE MAGNITUDE OF A LOAD

This invention relates to a fibre reinforced, resin composite leaf spring for determining the magnitude of a load applied to it in use.

There are applications where there is a need to be able to determine the magnitude of loads applied to leaf springs. Such applications include loads carried by vehicles. In some such applications it has been the practice to use strain gauges but these are generally restricted to laboratory use. These have had to be applied externally, giving rise to problems occasioned by exposure to environmental conditions and accidental damage. In the weighing of loads carried by vehicles, and the distribution thereof, various proposals have been made in the past based on measuring the deflection of vehicle springs and interposing of load cells between the load and a part or parts of a vehicle chassis. These have failed to provide a satisfactory and acceptable solution for a variety of reasons. Load cells are expensive, frictional variations in multi-leaf vehicle springs lead to inaccuracies and all such devices are difficult to protect from exposure to the elements and accidental damage.

The fibre reinforced resin composite member of our invention provides a facility for the weighing of vehicle loads.

According to one aspect the present invention consists in a method of making a fibre-reinforced, resin composite leaf spring for determining the magnitude of a load, comprising the steps of: superimposing a first outer spring element, an inner element and a second outer spring element and bonding said elements together, said inner element comprising a plurality of layers of cured resin impregnated fibres and each said outer element comprising at least one layer of spring material; during laying up of said layers introducing into a part of the composite leaf spring in which a bending moment is induced in use a strain responsive member which is orientated so as to be subjected to a strain resulting from the bending moment induced in use and which by being introduced during the laying up of said layers is thereby located, embedded and secured within the solid finished composite leaf spring, and embedding within the composite leaf spring signalling means extending between said strain responsive member and an end of the composite leaf spring.

According to a further aspect the invention consists in a fibre-reinforced, resin composite leaf spring made by the method as aforesaid for determining the magnitude of a load.

The strain responsive member may be located and held within the composite leaf spring so as to respond, for example, to a tensile, compressive or torsional strain (or any combination of these) in the composite leaf spring.

The signalling means may be adapted to communicate a signal from the strain responsive member to an indicator or monitoring device.

A second strain responsive member may be located and held within the composite member in proximity to the strain responsive member (the first strain responsive member) and second signalling means may be provided to communicate to the indicator or monitoring device a signal (the second signal) from the second strain responsive member such that the resultant or summation of the first and second signals taken together is a function of a strain detected by the first strain responsive member when the second strain responsive member is at the neutral plane of the composite leaf spring when loaded and the first strain responsive member is spaced from said neutral plane, or of strains detected by the first and second strain responsive members when both strain responsive members are spaced from said neutral plane.

The first and second strain responsive members may comprise strain gauges spaced longitudinally of the composite leaf spring in the same longitudinal plane through the composite leaf member and orientated in the same direction.

The strain gauges may be mounted on a carrier strip or incorporated in a printed circuit whereby they are accurately located relative to one another and the carrier strip or printed circuit is bonded into the composite leaf spring. The outer elements of the composite leaf may, for example, be metal leaf springs or fibres of metal, carbon, glass or thermoplastic material (or any combination of these) incorporated in a matrix of cured resin. The cured resin impregnated fibres in the layer or layers of the inner element may be, for example, glass or jute fibre. The three elements may be co-extensive over all, or most, of their length.

The composite leaf spring may be encased in a thermoplastic or resilient covering for protective purposes. This cover may, for example, be of rubber or polyurethane, in paint or plastic form, polyethylene or polypropylene. If metal spring leaves are used in the composite leaf spring they may be exposed, or embedded in a protective covering.

Where two or more strain responsive members are contained within the composite leaf spring they may be in the same plane, for example horizontally or vertically, or in different planes, and they may be orientated in the same direction or in different directions.

Preferably the strain responsive member or members are orientated in the direction of strain in the composite leaf spring.

Embodiments of the invention will now be described by way of example with reference to the accompanying drawings in which:

FIG. 1 is a side elevation of a composite leaf spring,

FIG. 2 is a plan view of the spring of FIG. 1,

Figure 3:
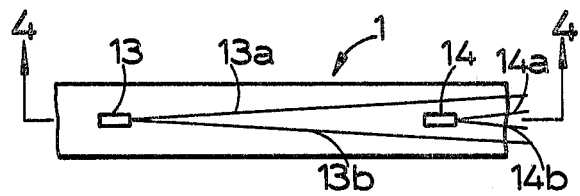
Figure 4:
Figure 5:
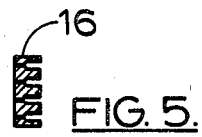
Figure 6:
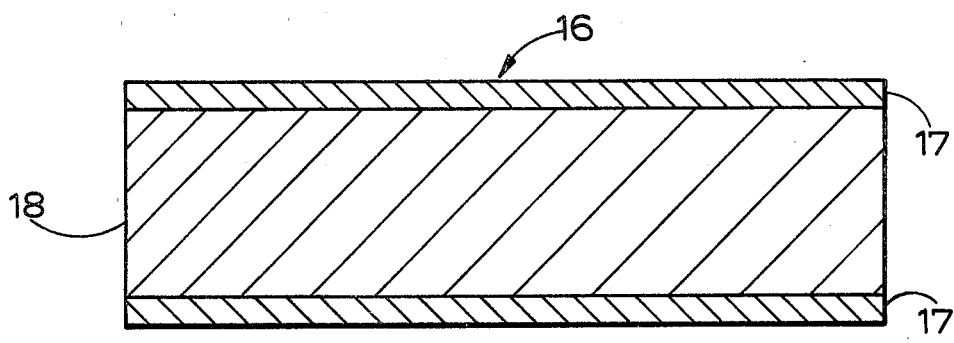
Figure 7:
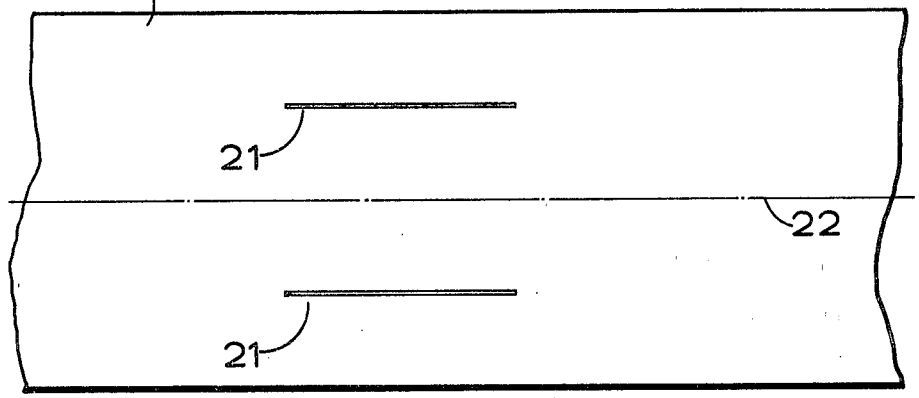
Figure 8:
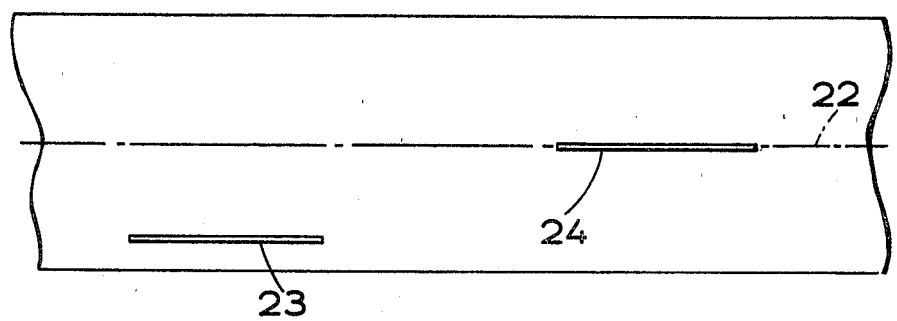
Figure 9:
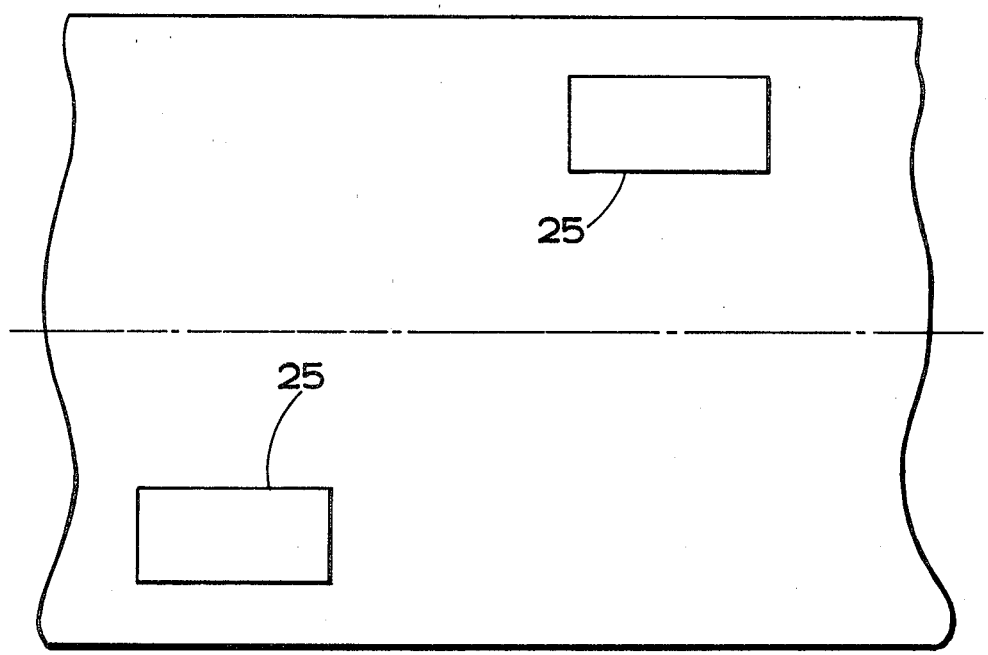

FIG. 3 is a section through the spring showing two strain responsive members which are in the same longitudinal plane through the spring and in the same orientation, FIG. 4 is a section on line 4—4 of FIG. 3, FIG. 5 is a section through a connecting block, FIG. 6 is a transverse section through another composite leaf spring, FIGS. 7 and 8 are fragmentary longitudinal sections through further composite leaf springs showing alternative locations of two strain responsive members in each spring, FIG. 9 is a fragmentary longitudinal section through yet another composite leaf spring showing locations of two strain responsive members, and FIGS. 10 and 11 are a side elevation and a plan view respectively of a composite leaf spring having two blades.

Referring to FIGS. 1 to 5, a composite leaf spring 1 is shown which is adapted for use in the suspension of a vehicle. The composite leaf spring 1 has an eye end fitting 2, which may be of forged steel, secured to the upper surface at one end 3 by through bolts 4 and nuts 5 which clamp against a steel pressure plate 6 on the lower surface of the leaf spring. Intermediate the ends of the composite member 1 acetal bearing pads 7 are located by a bolt 8 and a nut 9 on the lower and upper surfaces of the leaf spring. A hardened steel rubbing plate 11 is bonded to the upper surface of the composite leaf spring 1 at its other end 12.

The composite leaf spring 1 may be made of three elements in a known manner. These comprise upper and lower elements of one or more superimposed strips of pre-impregnated longitudinally extending carbon fibres, or a mix of carbon and glass fibres, and an inner element of one or more superimposed strips of pre-impregnated glass fibres. During laying up of the pre-impregnated strips two strain gauges 13, 14 and their leads 13a, 13b, 14a, 14b are introduced into the active length of the spring which experiences a bending moment on the application of a load. The gauges 13, 14 are positioned at a predetermined distance apart and away from the neutral plane 15 of the leaf spring 1 when loaded. The leads 13a, 13b, 14a, 14b extend to the end 12 of the leaf spring 1.

The laid up composite leaf spring is cured in known manner by hot press moulding with the plate 11 located in the tool so that it is bonded to the composite leaf spring during curing. Alternatively, this plate may be secured by adhesive after curing.

A connector socket, not shown, is secured to each wire after curing of the composite leaf spring and an insulating block 16 is fitted to retain these sockets whereby a plug connector with multicore cable may be inserted to carry signals from the strain gauges to suitable indicating or monitoring apparatus. The block 15 may be cast in a plastics material, may be moulded in rubber or may be fitted and secured to the end 12 of the composite leaf spring with the aid of adhesive.

In a leaf spring having two strain gauges in the same orientation and in which the load applied to the spring is to be gauged by measuring the difference in strain between the gauges, the latter should be sufficiently close to one another to minimise temperature differences between them but sufficiently far apart to obtain a satisfactory measurable difference in strain. From the difference in strain over a set known length of the leaf spring the load applied to the spring can be determined. In this type of construction the two strain gauges may be mounted on or be integral with a carrier strip so that their linear spacing is accurately maintained during moulding. Alternatively they may, together with their signalling leads, be incorporated in a printed circuit which is introduced during laying up of the composite leaf spring.

In the design of a composite leaf spring according to the invention it will be appreciated that the operating strain of a gauge must not be exceeded in use or it will be broken. Similarly the elastic limit of the signalling wires must not be exceeded.

It will be appreciated that provision may be required in apparatus to which two or more gauges are connected to compensate for different lengths of leads from the gauges and for any change in gauge resistance occurring during moulding. If two two gauges are provided which are vertically separated, that is one above the other, for example one either side of the neutral plane, this may save any requirement for lead length compensation. It can provide a satisfactory signal of difference in strain between the two gauges due to one being in compression and the other in tension. There will be a small separation between them and consequently any requirement for temperature compensation may also be avoided.

Springs of composite material generally fail suddenly and without prior warning following an overload. In a composite leaf spring made by the method according to this invention one or more strain responsive members may be adapted, in conjunction with an indicating or monitoring device, to give a warning when the design load (or any other predetermined load) is applied to the member so that overloading may be avoided. This may be facilitated by providing one or more strain responsive members in a high strain region of the composite leaf spring.

The number of strain responsive members to be incorporated in the composite leaf spring will depend on a number of factors, including space availability, the way in which it is desired to measure a load applied to the composite leaf spring and the degree of accuracy of measurement which is required. For example, the strain in a single strain gauge may be used to provide the required measurement. Alternatively the difference between strains in two or more strain gauges may be used, or an average of these strains. The strains in two or more gauges may be compared, or averaged and compared, with the strain in one or more other gauges.

Reference will now be made to FIG. 6 in which a composite leaf spring 16 comprises outer steel spring leaves 17 which are bonded to a cured fibre, for example glass fibre, reinforced resin interior 18. One or more strain responsive members, for example in the form of strain gauges, may be located at the steel resin interface or within the resin.

In FIG. 7, a composite leaf spring 19 has two strain gauges 21 located and held within it equi-distant from and to either side of the neutral plane 22 of the leaf spring when loaded.

In FIG. 8 a similar composite leaf spring has a strain gauge at 23 below the neutral plane 22 and a second strain gauge 24 which lies along the neutral plane.

A further variation is shown in FIG. 9 in which strain gauges 25 are situated in laterally spaced locations in the composite leaf spring.

The signalling leads for the strain gauges have been omitted from FIGS. 7 to 9 inclusive.

Referring now to FIGS. 10 and 11, a two leaf spring is shown in which the upper leaf 26 is generally similar to that described with reference to FIGS. 1 to 5. The lower leaf 27 may similarly be of composite material and secured to the upper leaf by means of resilient pads 28, for example of neoprene, which are bonded to the two leaves at spaced locations. Bearing pads, as 7, are located above the upper leaf 26 and below the lower leaf 27. A strain responsive member or members may be incorporated in either the upper leaf 26 or, as shown at 29, in the lower leaf. The signalling leads have also been omitted from these Figures.

The composite leaf springs which have been described are relatively flexible and in each case the deflection of a leaf spring is used to give load indication. This load indication can provide a facility for continuous recording of loads.

We claim:

1. A method of making a fibre-reinforced, resin composite leaf spring for determining the magnitude of a load, comprising the steps of: superimposing a first outer spring element, an inner element and a second outer spring element and bonding said elements together, said inner element comprising a plurality of layers of cured resin impregnated fibres and each said outer element comprising at least one layer of spring material; during laying up of said layers introducing into a part of the composite leaf spring in which a bending moment is induced in use a strain responsive member which is orientated so as to be subjected to a strain resulting from the bending moment induced in use and which by being introduced during the laying up of said layers is thereby located, embedded and secured within the solid finished composite leaf spring, and embedding within the composite leaf spring signalling means extending between said strain responsive member and an end of the composite leaf spring.

2. A method according to claim 1 in which each said outer element comprises a plurality of superimposed layers of cured resin impregnated fibres which are predominantly longitudinally orientated, and in which said outer and inner elements and the layers of which they are composed are bonded by a hot press moulding operation.

3. A method according to claim 1 in which at least one of said outer elements comprises a metal leaf spring element and said strain responsive member is located and secured at an interface between said inner element and said metal outer leaf spring element.

4. A method according to claim 1 in which at least one of said outer elements comprises a metal leaf spring element and said strain responsive member is located within said inner element.

5. A fibre-reinforced, resin composite leaf spring for determining the magnitude of a load made by the method according to claim 1 and in which said signalling means (said first signalling means) is adapted to communicate a signal (said first signal) from said strain responsive member (said first strain responsive member) to an indicator or monitoring device, a second strain responsive member is located and held within the composite leaf spring in proximity to said first strain responsive member, and second signalling means is provided embedded within the composite leaf spring and adapted to communicate to the indicator or monitoring device a signal (said second signal) from said second strain responsive member, such that the resultant or summation of said first and second signals taken together is a function of either a strain detected by said first strain responsive member when said second strain responsive member is at a neutral plane of the composite leaf spring when loaded and said first strain responsive member is spaced from said neutral plane, or of strains detected by said first and second strain responsive members when both said strain responsive members are spaced from said neutral plane.

6. A fibre-reinforced, resin composite leaf spring according to claim 5 in which said first and second strain responsive members comprise respective strain gauges spaced longitudinally of the composite leaf spring in the longitudinal plane through the composite leaf spring and orientated in the same direction.

7. A fibre-reinforced, resin composite leaf spring according to claim 6 in which said strain gauges are mounted on a carrier strip whereby they are accurately located relative to one another and said carrier strip is bonded into the composite leaf spring.

8. A fibre-reinforced, resin composite leaf spring according to claim 6 in which said strain gauges are incorporated in a printed circuit whereby they are accurately located relative to one another and said printed circuit is bonded into the composite leaf spring.

9. A fibre-reinforced resin composite leaf spring according to claim 5 in which said first and second strain responsive members comprise respective strain gauges spaced from one another in a direction away from said neutral plane of the composite leaf spring when loaded.

10. A fibre-reinforced resin composite leaf spring according to claim 5 in which intermediate its ends the composite leaf spring has aligned bearing pads located on and secured between upper and lower surfaces thereof, and at each end the composite leaf spring has an attachment member or rubbing pad such that the composite leaf spring is adapted for use in the suspension of a vehicle, said bearing pads being adapted for connection to a wheel carrying axle of the vehicle.

11. A fibre-reinforced resin composite leaf spring according to claim 5 in which a protective coating of rubber, polyurethane, polyethylene or polypropylene is applied over said bonded outer and inner spring elements.

* * * * *